US012620878B2

(12) United States Patent
Agapiou et al.

(10) Patent No.: US 12,620,878 B2
(45) Date of Patent: May 5, 2026

(54) METHOD FOR STATOR ALIGNMENT TO THE MOTOR HOUSING

(71) Applicant: GM GLOBAL TECHNOLOGY OPERATIONS LLC, Detroit, MI (US)

(72) Inventors: John S. Agapiou, Rochester Hills, MI (US); Timothy M. Wilson, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 909 days.

(21) Appl. No.: 17/886,943

(22) Filed: Aug. 12, 2022

(65) Prior Publication Data

US 2024/0055961 A1     Feb. 15, 2024

(51) Int. Cl.
*H02K 15/028* (2025.01)
*H02K 1/18* (2006.01)

(52) U.S. Cl.
CPC ........... *H02K 15/028* (2013.01); *H02K 1/185* (2013.01)

(58) Field of Classification Search
CPC ...... H02K 15/028; H02K 15/02; H02K 15/16; H02K 1/185
See application file for complete search history.

(56) References Cited

U.S. PATENT DOCUMENTS

2002/0083572 A1* 7/2002 Mirpuri ................ H02K 15/028
29/592.1
2007/0278979 A1* 12/2007 Hashimoto ............ H02K 15/16
318/538

* cited by examiner

*Primary Examiner* — Livius R. Cazan

(57)                ABSTRACT

A method of installing a stator and a motor housing includes inserting a stator into a motor housing, the motor housing having a shaft bore and a plurality first bolt holes end of the state are having a bore opening and a plurality of second bolt holes. A centering fixture is inserted into the shaft bore of the housing and into the bore opening, the centering fixture includes a first centering device received into the shaft bore and a second centering device received into the bore opening of the stator. A locating plate is secured to the motor housing and engaged with the centering fixture. The first centering devices actuated for centering the centering fixture relative to the shaft and the second centering device is actuated for centering the state are relative to the shaft board. The plurality of bolts are tightened to secure the stator to the motor housing.

12 Claims, 15 Drawing Sheets

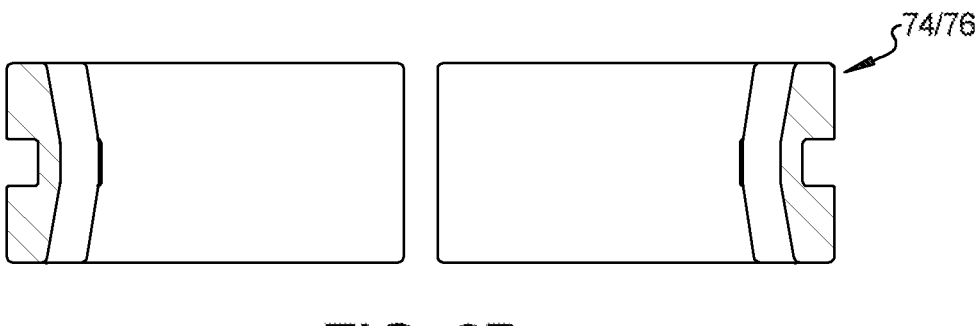
FIG. 6B
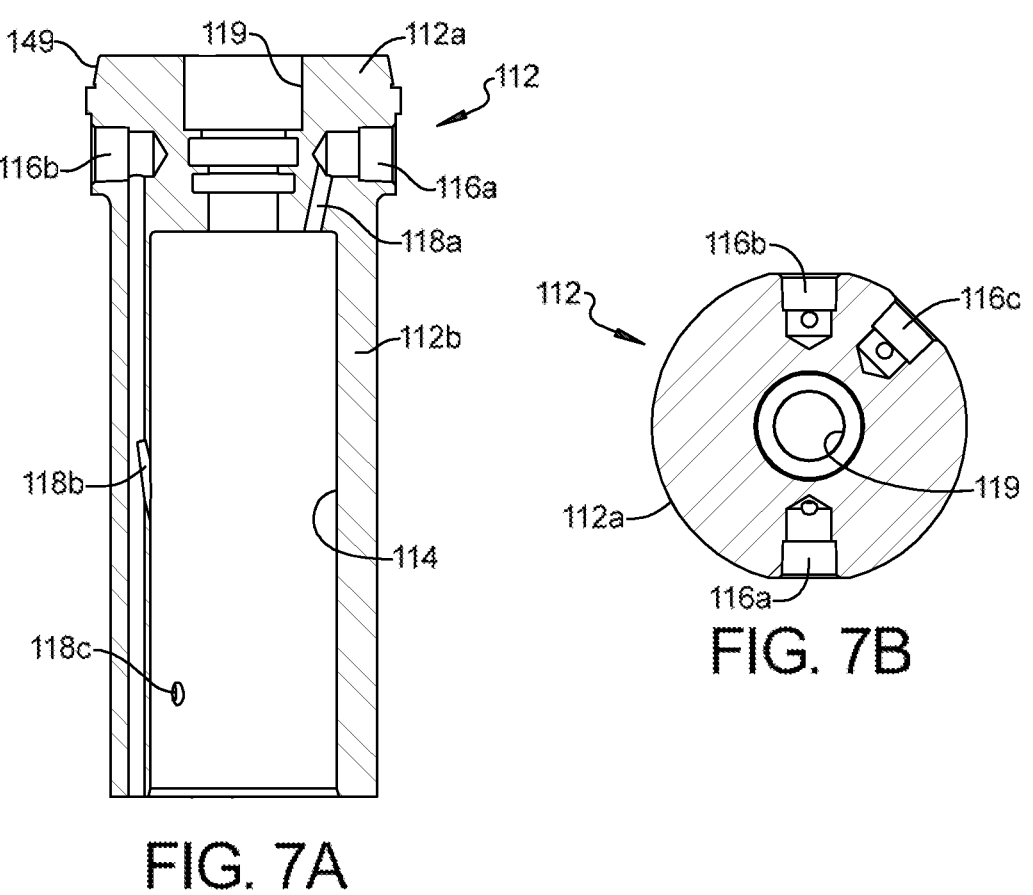
FIG. 7A
FIG. 7B

140/142

113

METHOD FOR STATOR ALIGNMENT TO THE MOTOR HOUSING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a method of assembling a motor and more particularly to a method of aligning a stator to a motor housing.

In some motor constructions, a stator is shrink fit within a bore of a motor housing. With this construction, it is difficult to maintenance and repair the motor. In other constructions, a stator is bolted within the motor housing and allows for easier maintenance and repair of the motor. Although the motor housing and stator can be manufactured with tight tolerances, it is still difficult to assemble the stator to be properly located with precision. A precise location of the stator allows for an improved air gap between the rotor and stator for optimal motor performance.

SUMMARY

A method of installing a stator in a motor housing includes inserting a stator into a motor housing, the motor housing having a shaft bore and a plurality of first bolt holes and the stator having a bore opening and a plurality of second bolt holes. A centering fixture is inserted into the shaft bore of the housing and into the bore opening of the stator. The centering fixture includes a first centering device received into the shaft bore and a second centering device received into the bore opening of the stator. A locating plate is secured to the motor housing and engaged with the centering fixture. The first centering device is actuated for centering the centering fixture relative to the shaft bore and the second centering device is actuated for centering the stator relative to the shaft bore. The plurality of bolts are tightened to secure the stator to the motor housing.

According to a further aspect, the centering fixture further includes a third centering device that is received in an aperture in the locating plate.

According to another aspect, the locating plate includes at least one locating dowel for engagement with a corresponding guide hole of the motor housing.

According to yet another aspect, securing the locating plate to the motor housing includes securing the locating plate to the mounting flange of the motor housing.

According to yet another aspect, the locating plate includes open regions that allow access to the plurality of bolts.

According to still another aspect, the first centering device and the second centering device of the centering fixture includes a hydraulic actuated centering device.

According to a further aspect, the centering fixture is fixed to the locating plate.

According to a further aspect, a centering fixture for aligning a stator with a motor housing includes a first centering sleeve actuatable to expand radially outward; a second centering sleeve adjacent to the first centering sleeve and actuatable to expand radially outward; and a third centering sleeve adjacent to the second centering sleeve and actuatable to expand radially outward.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1B is a cross-sectional view of the example centering fixture and fixture plate shown in FIG. 1a;

FIG. 6B is a cross-sectional view of the small collet of the centering fixture;

FIG. 7A is a longitudinal cross-sectional view of a rod of the centering fixture;

FIG. 7B is a second cross-sectional view of the rod of the centering fixture

In the drawings, reference numbers may be reused to identify similar and/or identical elements.

DETAILED DESCRIPTION

Figure 17:
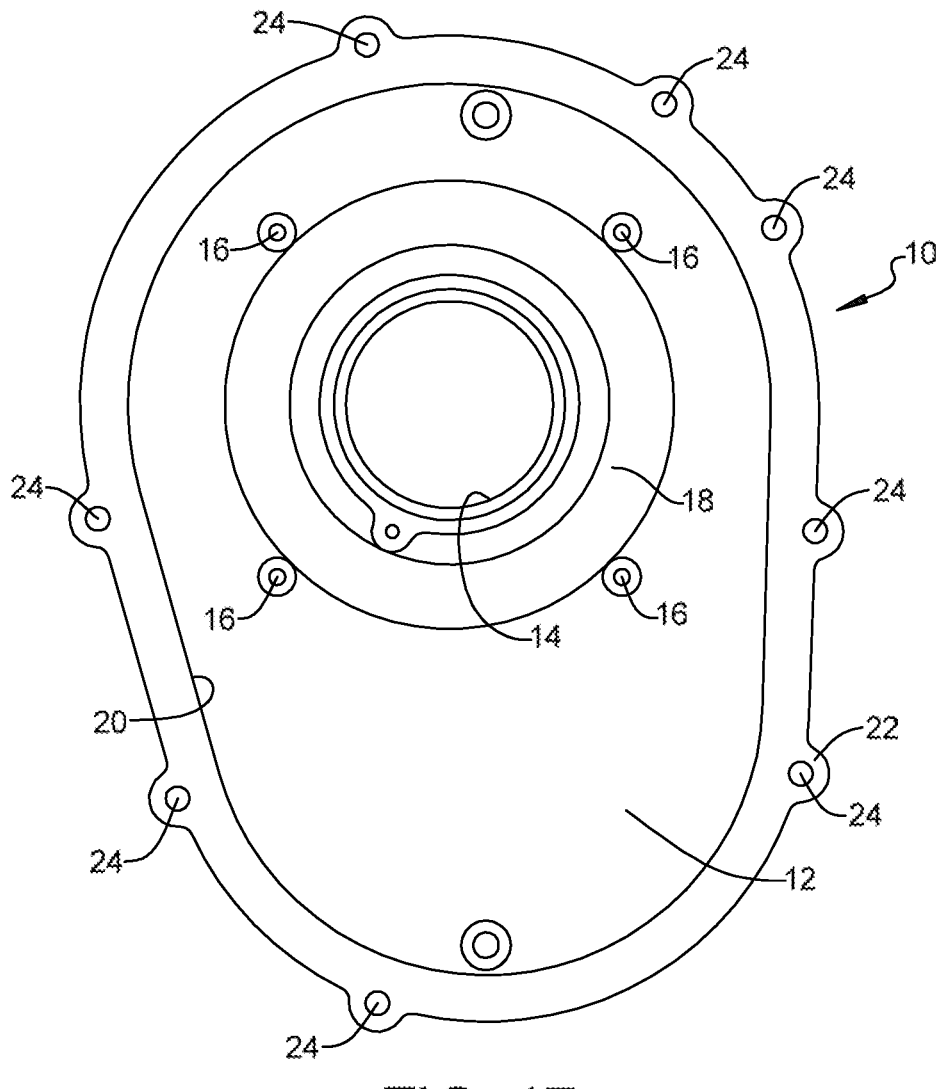
FIG. 17 is a schematic view of an example motor housing.

With reference to FIG. 17, an example electric motor housing 10 is shown. The example electric motor housing 10 includes a base wall 12 having a motor output shaft bore 14 and a plurality of threaded bolt holes 16 with a locating face surrounding the threaded hole to support the motor stator ears. The base wall 12 includes a planar surface 18 surrounding the output shaft bore 14. The electric motor housing 10 further includes a sidewall 20 extending from the base wall 12 and including a mounting flange 22 having a plurality of mounting apertures 24. The output shaft bore 14 can be configured to receive a seal and/or a bearing assembly for engaging an output shaft of the motor.

Figure 18:
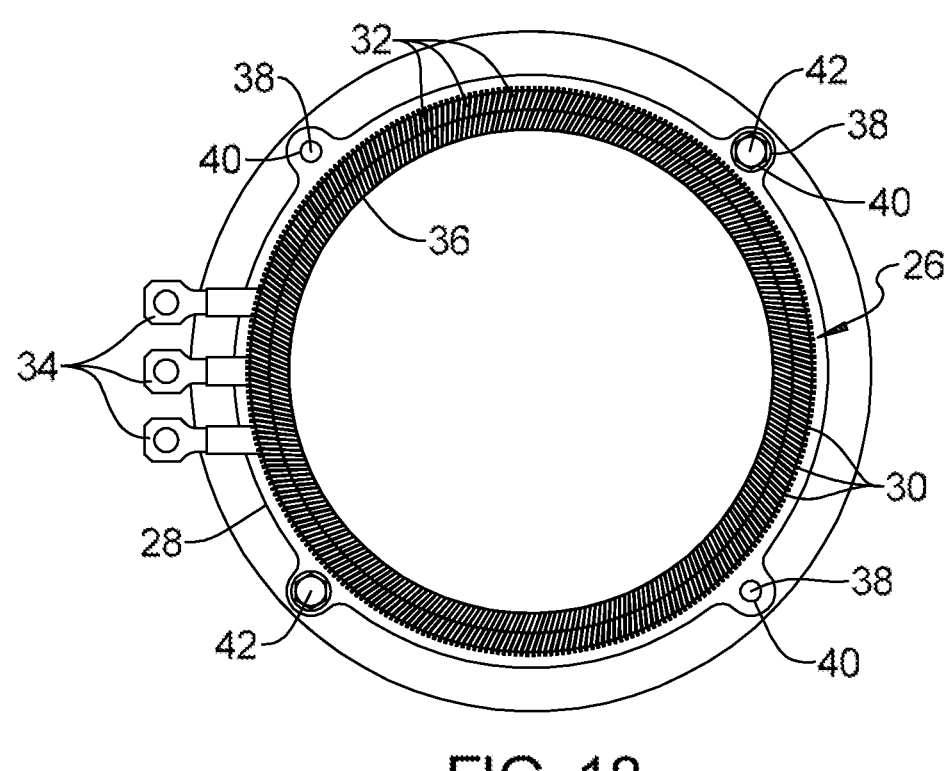
FIG. 18 is a schematic view of an example stator.

With reference to FIG. 18, an example motor stator 26 is shown including a cylindrical body 28 having a plurality of grooves 30 receiving windings 32 and electrical connectors 34, as is known in the art. The cylindrical body 28 can include a stator bore 36 and a plurality of mounting bosses 38 each having a mounting aperture 40 therein. The number and location of the mounting bosses 38 and mounting apertures 40 correspond to the threaded bolt holes 16 with the locating surfaces in the motor housing 10.

Figure 19:
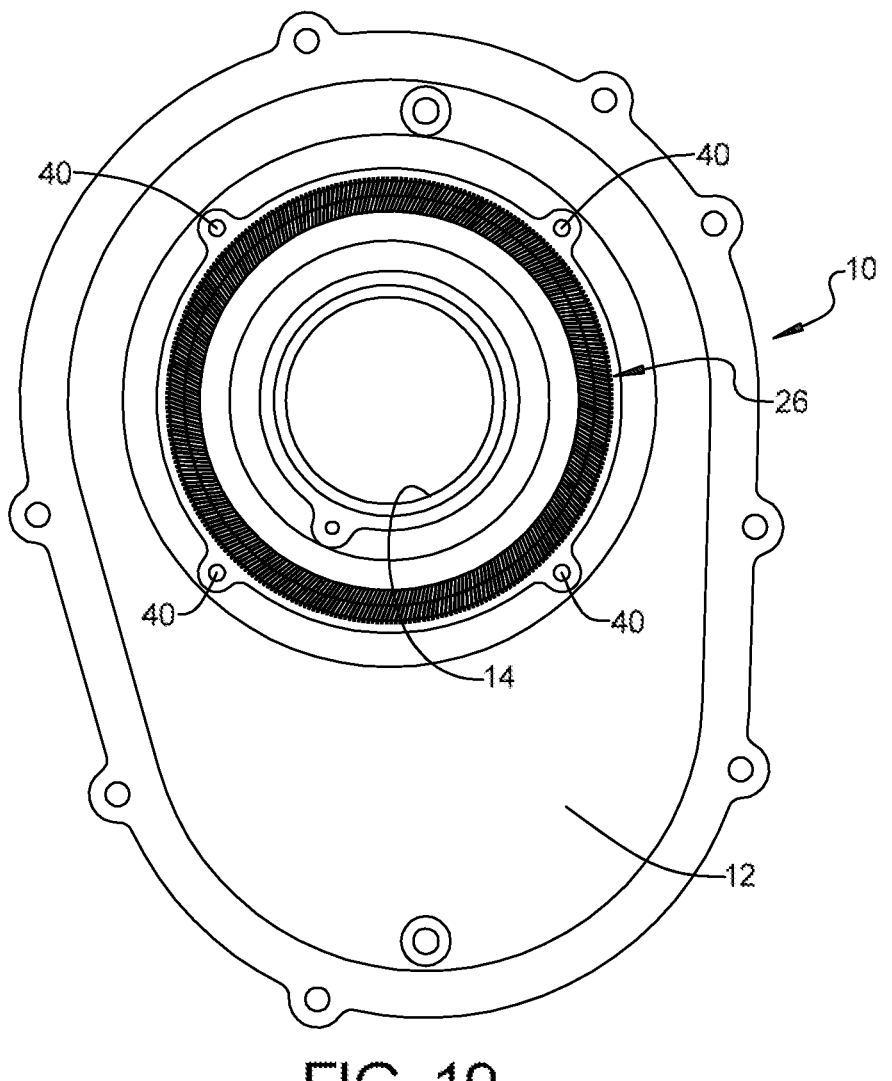
FIG. 19 is a schematic view of the stator received in the motor housing.

During assembly, the motor stator 26 is inserted into the motor housing 10, as illustrated in FIG. 19. There are tolerances that apply to the motor housing 10 and motor stator 26, however, even with such tolerances, it is a challenge to ensure that the motor stator bore 36 is precisely centered with respect to the output shaft bore 14 of the motor housing 10. This is because there are additional spacings between the mounting apertures 40 and the bolts 42 that are utilized for mounting the stator 26 to the motor housing 10. Accordingly, once the stator 26 is inserted into the motor housing 10, the bolts 42 can be inserted into the mounting apertures 40 and loosely engaged with the threaded bolt hole 16 in the base wall 12 of the motor housing 10, as shown in FIG. 19.

Figure 1A:
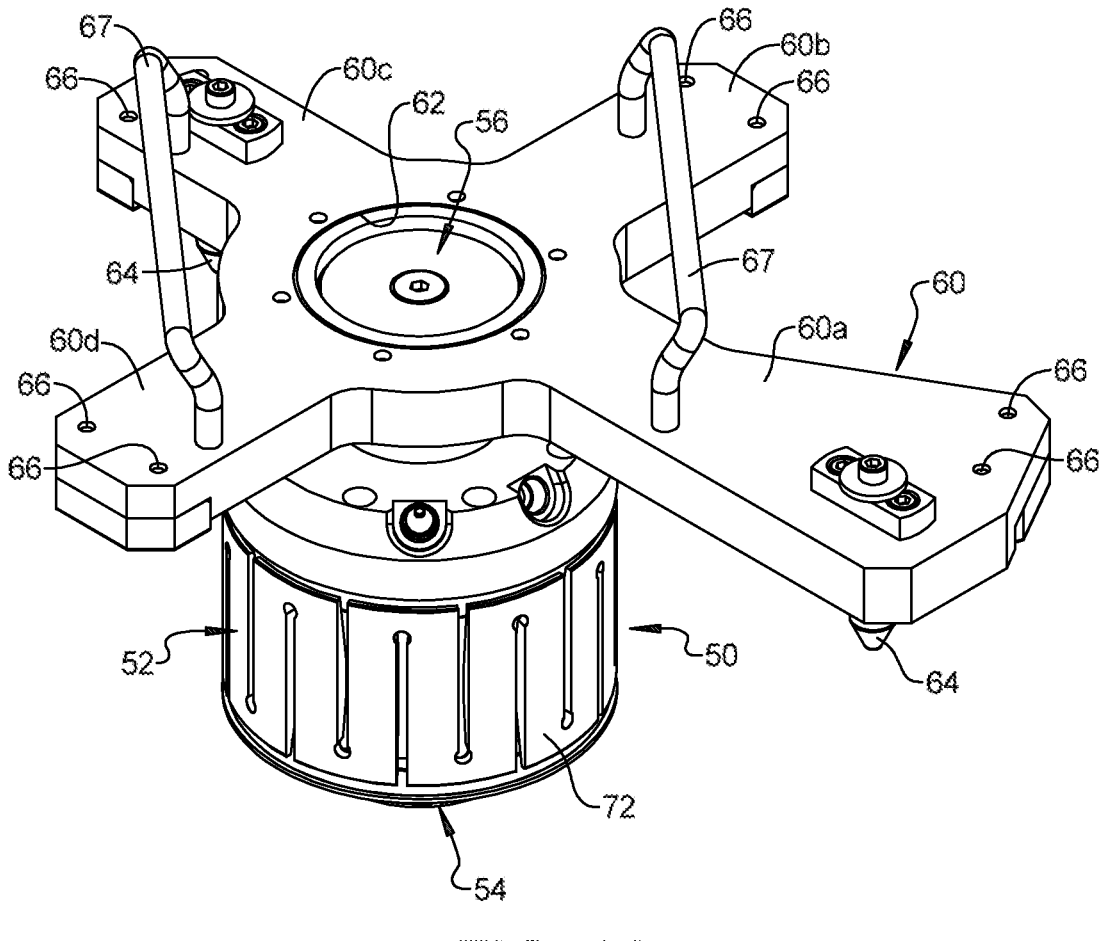
FIG. 1A is a perspective view of an example centering fixture and fixture plate used for installing a stator and a motor housing according to the principles of the present disclosure.
Figure 1B:
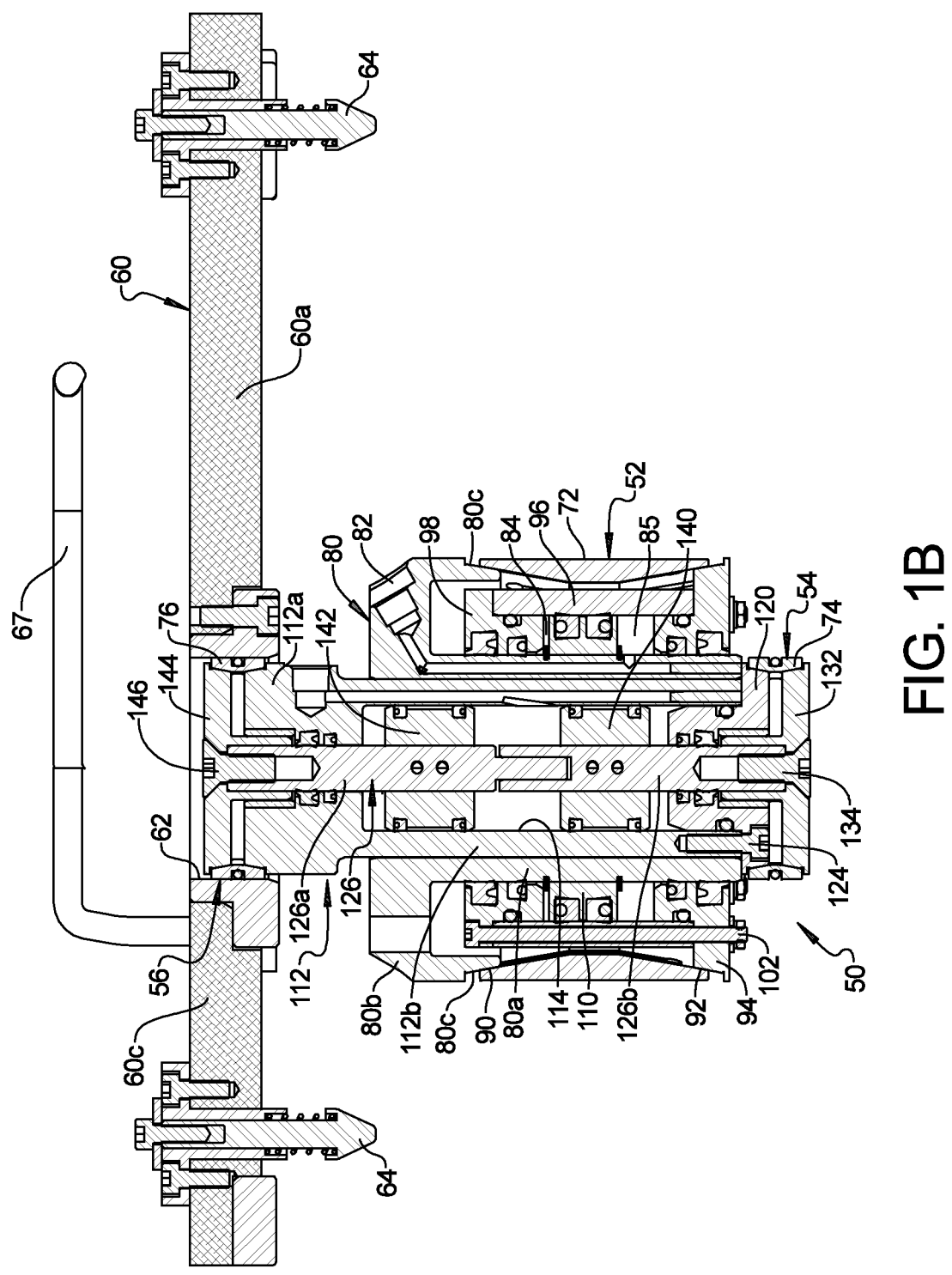
Figure 20:
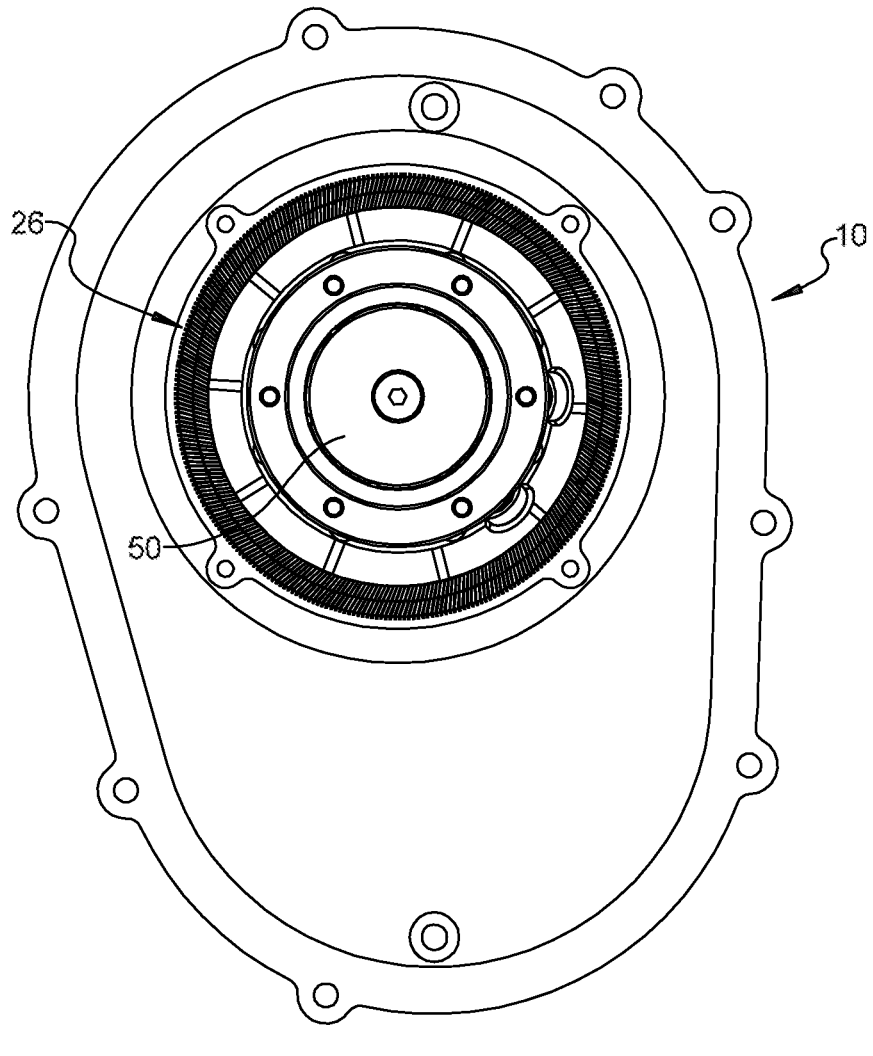
FIG. 20 is a schematic view of the centering fixture inserted into the stator within the motor housing.

With reference to FIG. 20, a centering fixture 50, described in greater detail herein with reference to FIGS. 1-16, is then inserted into the stator bore 36 and the output shaft bore 14 of the motor housing 10. In particular, as shown in FIGS. 1a and 1b, the centering fixture 50 includes a first centering sleeve device 52 that is received in the stator bore 36 of the stator 26, a second centering sleeve device 54 that is received in the output shaft bore 14 of the motor housing 10 and a third centering sleeve device 56.

Figure 21:
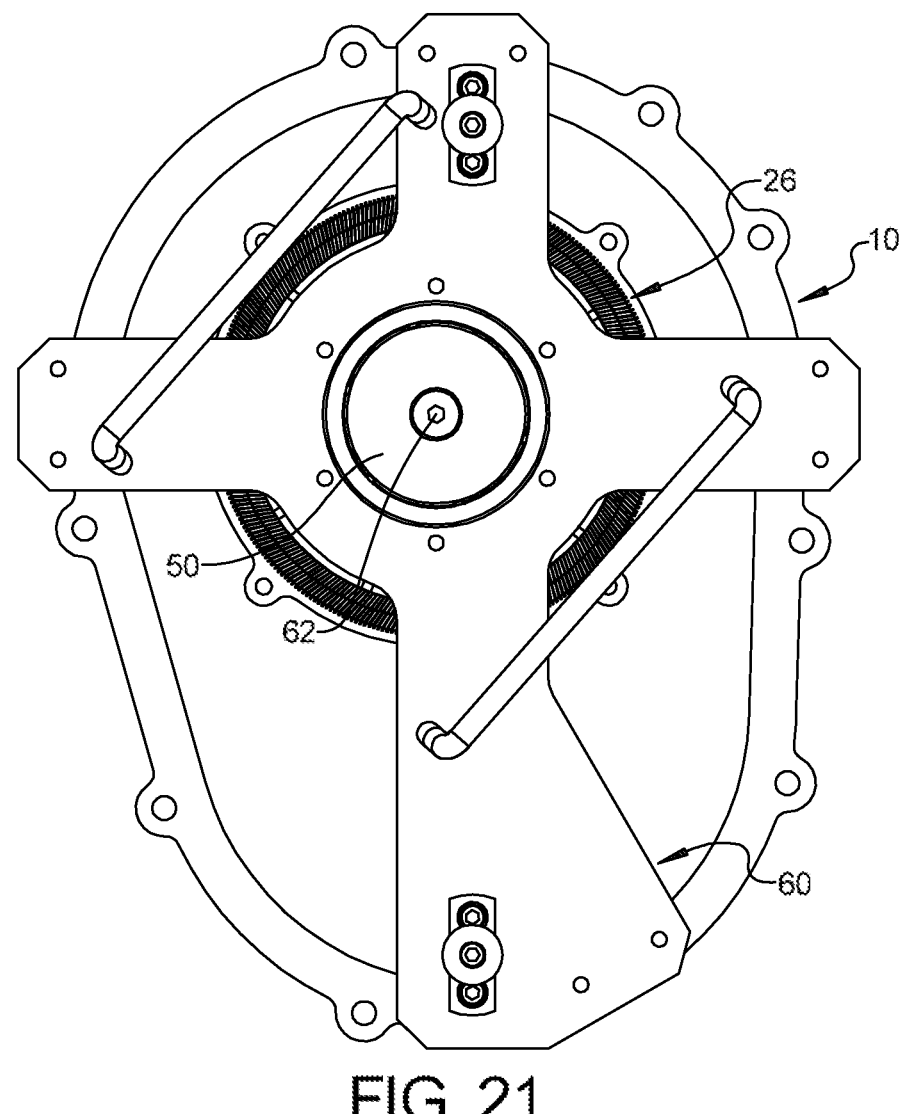
FIG. 21 is a schematic view of the locator plate assembled to the motor housing and receiving the centering fixture for centering the stator within the motor housing.

After the centering fixture 50 is inserted with the second centering sleeve device 54 in the output shaft bore 14 and the first centering sleeve device 52 in the stator bore 36, a locating plate 60 is fixed to the motor housing 10 with the third centering device 56 received in an aperture 62 in the locating plate 60, as shown in FIG. 21. The locating plate 60 can be fixed to the motor housing 10 by one or more clamps or by mounting the locating plate to the mounting flange 22 by inserting fasteners that are engaged with the mounting apertures 24. Alternatively, the locating plate 60 can be fixedly attached in a centered relationship to the centering fixture 50, without needing a third centering device 56. The locating plate 60 can include dowels 64, pins or fasteners that engage corresponding apertures 24 or recesses formed in the motor housing 10 to properly locate the locating plate 60 relative to the motor housing 10.

The centering sleeve devices 52, 54, 56 of the centering fixture 50 can each be actuated for centering the bore 36 of stator 26 relative to the output shaft bore 14 of the motor housing 10 and the aperture 62 in the locating plate 60. Each of the mounting bolts 42 are then tightened in order to secure the stator 26 within the motor housing 10 in a properly centered location of bore 36 with respect to the output shaft bore 14. The locating plate 60 is configured to allow access to the mounting bolts 42 by a tool. In the particular embodiment shown, the locating plate 60 (FIG. 16) is formed in a cross-shape with a plurality of arms 60a-60d and includes apertures 66 and/or dowels 64 for locating and fixing the locating plate 60 to the motor housing 10. The locating plate 60 can include a pair of handles 67 for lifting the locating plate 60 into and out of place.

After the stator 26 is fixed in the motor housing 10, the locating plate 60 and centering fixture 50 are removed from the motor housing 10. Then, the electrical connectors 34 can be connected to corresponding electrical connectors (not shown) Within the motor housing 10. A motor rotor can be mounted to the motor housing 10 concentric to the stator 26 and with a shaft at a first end of the motor rotor that extends through the output shaft bore 14. A motor cover (not shown) is mounted to the motor housing 10 and includes a bore and bearing assembly that received a second end of the motor rotor. The location of the aperture 62 in the locating plate 60 simulates a location of the bore and bearing assembly within the motor cover.

With reference to FIGS. 1a-16, the centering fixture 50 will now be described. The centering fixture 50 can be hydraulically, pneumatically, mechanically, or electro-mechanically actuated. Each of the centering sleeve devices 52, 54 and 56 include an expansion sleeve or collet 72, 74, 76, respectively.

Figures 2A, 2B:
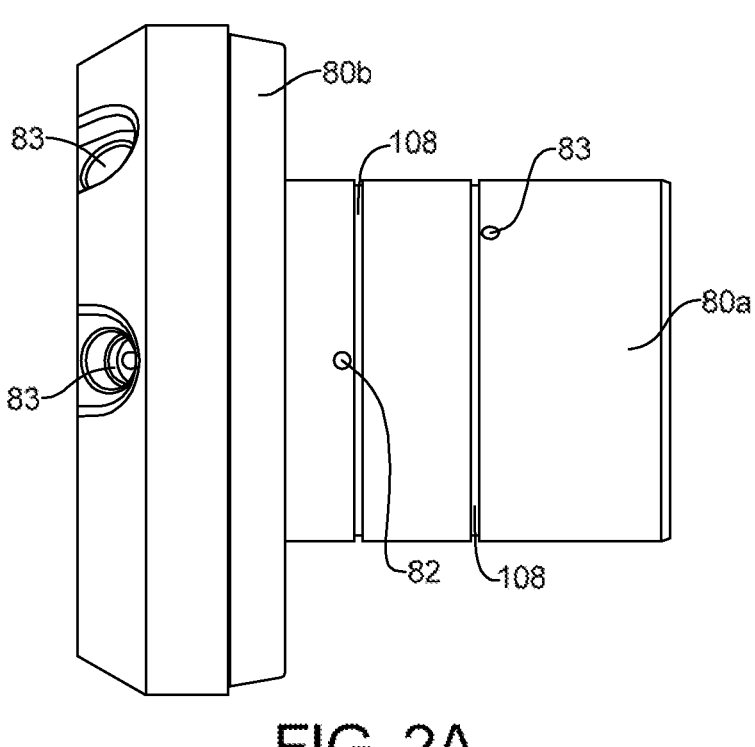
FIG. 2A is a side plan view of a body of the centering fixture.
FIG. 2B is a cross-sectional view of a body of the centering fixture.

With reference to FIGS. 1b, 2a and 2b, the centering fixture includes a body 80 that includes a sleeve portion 80a and a flange portion 80b. A first internal hydraulic passage 82 is provided in the body 80 and communicates with a first hydraulic chamber 84 for expanding the first centering device 52. A second internal hydraulic passage 83 is provided in the body 80 and communicates with a second hydraulic chamber 85 for contracting the first centering device 52.

Figure 3:
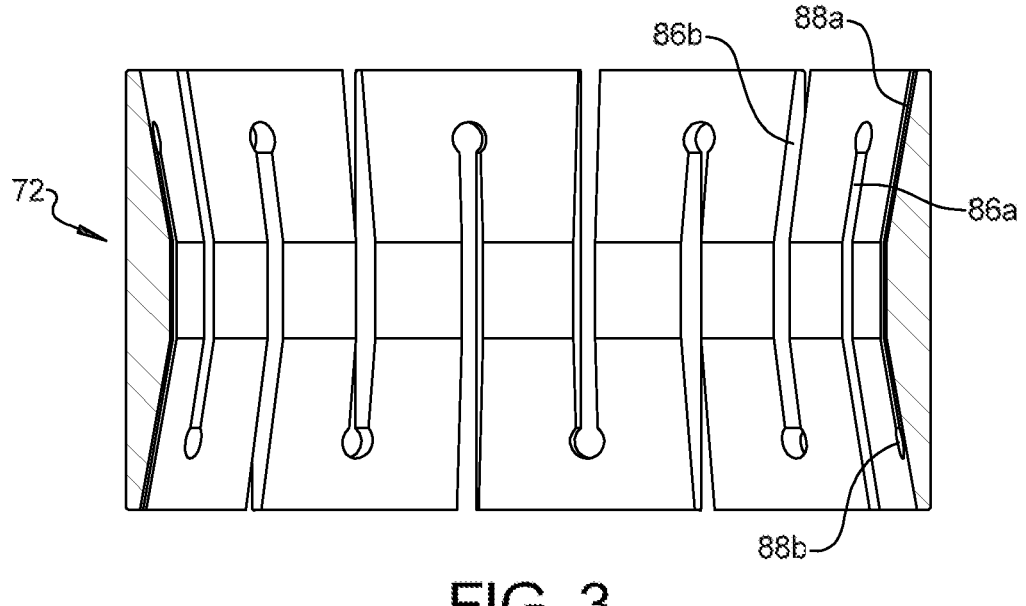
FIG. 3 is a cross-sectional view of a collet of the centering fixture.
Figure 4:
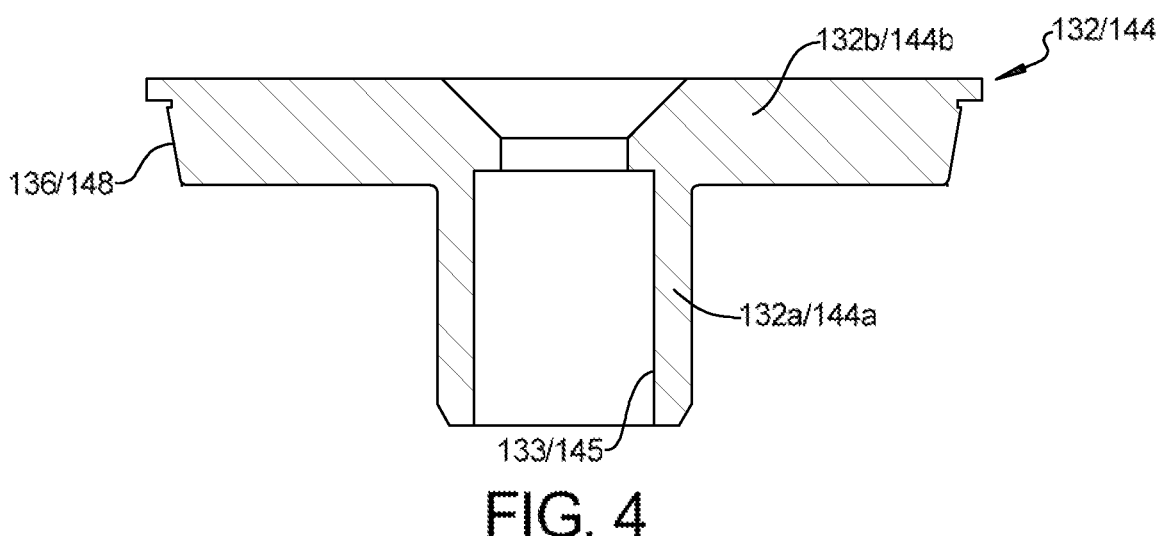
FIG. 4 is a cross-sectional view of a cap of the centering fixture.
Figure 5:
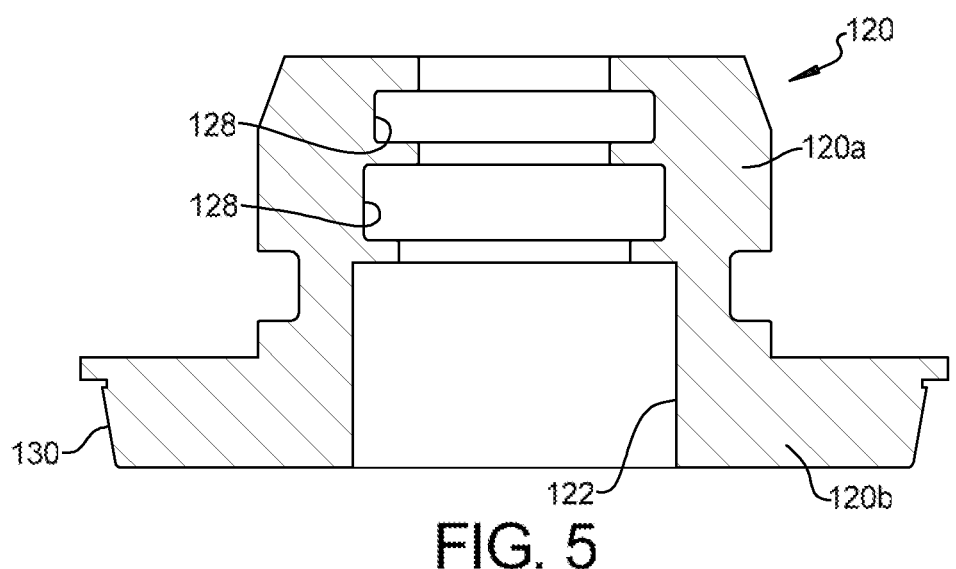
FIG. 5 is a cross-sectional view of another cap of the centering fixture.
Figure 6A:
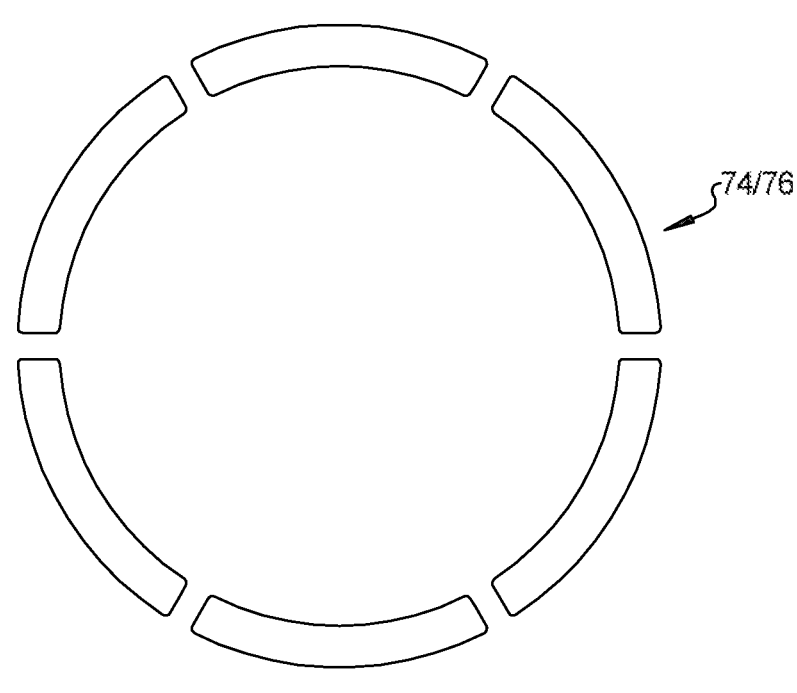
FIG. 6A is a plan view of a small collet of the centering fixture.

With reference to FIGS. 1b and 3, the first collet 72 of the first centering device 52 is shown. The first collet 72 is annular in shape and includes alternating cutouts 86a, 86b that extend from opposite ends. The first collet 72 serves as an outwardly expandable spring that surrounds the sleeve portion 80a of the body 80. Each end of the first collet 72 has a sloped interior surface 88a, 88b that tapers outward toward the opposite ends. The sloped interior surface 88a of the upper end of the first collet 72 is disposed against a sloped surface 90 of an axially extending annular portion 80c at a radially outer end of the flange portion 80b. The sloped interior surface 88b of the lower end of the first collet 72 is disposed against a sloped surface 92 of a first cap 94 (FIG. 12) that is disposed at a lower end of the sleeve portion 80a of the body 80.

Figure 13:
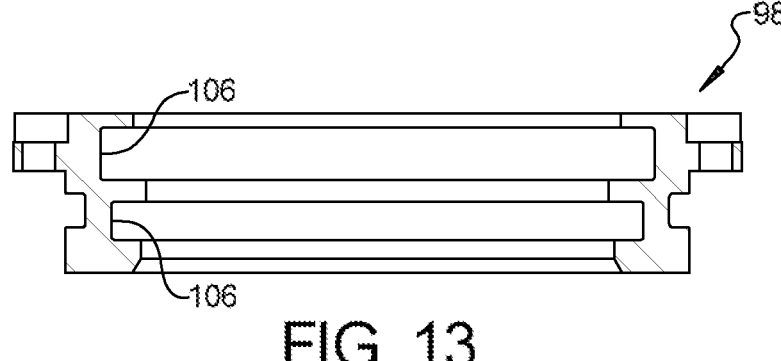
FIG. 13 is a cross-sectional view of a yet another cap of the centering fixture.
Figure 14:
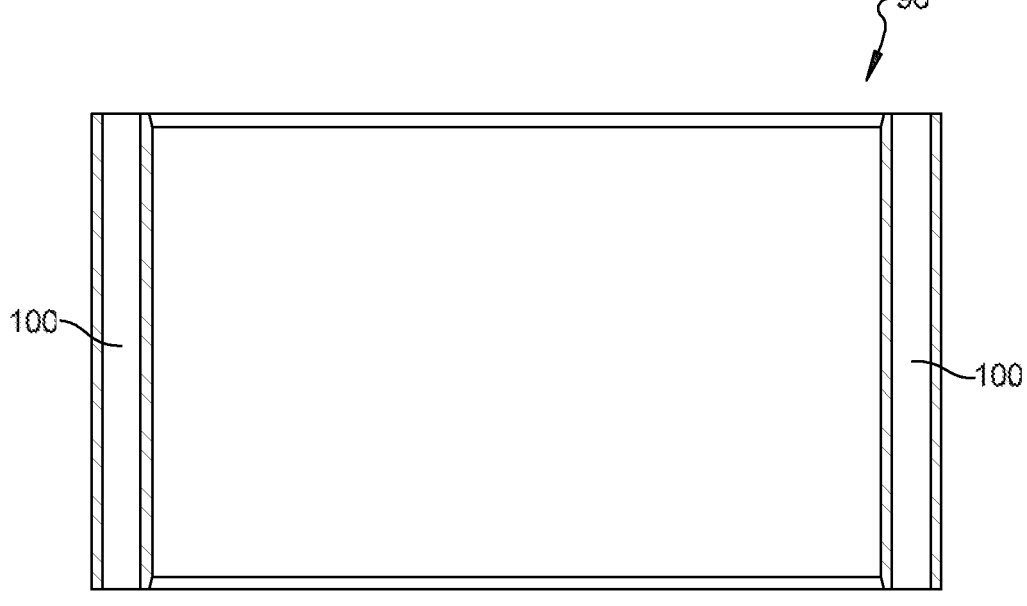
FIG. 14 is a cross-functional view of a sleeve of the centering fixture.
Figures 15, 16:
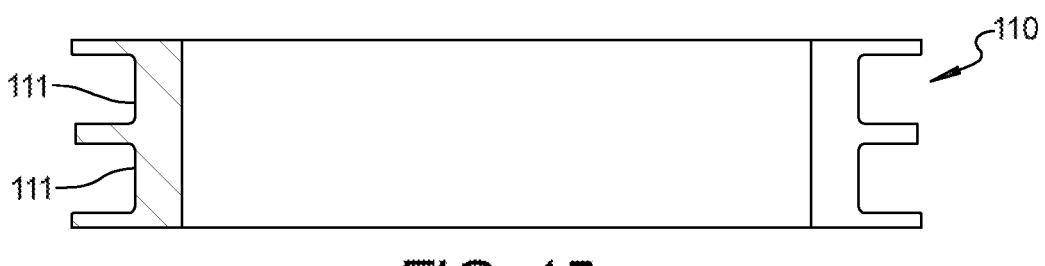
FIG. 15 is a cross-sectional view of a small piston of the centering fixture.
FIG. 16 is a plan view of the locating plate.

A sleeve 96 (FIG. 14) is disposed in between the first cap 94 and a second cap 98 (FIG. 13). The sleeve 96 includes a plurality of circumferentially spaced apertures 100 that receive fasteners 102 that support the sleeve to the first cap 94 and the second cap 98. The first cap 94 includes interior grooves 104 that receive seals that sealingly engage the sleeve portion 80a of the body 80. The second cap 98 includes interior grooves 106 that receive seals that sealingly engage the sleeve portion 80a of the body 80.

AS shown in FIGS. 2a and 2b, the sleeve portion 80a of the body 80 includes a pair of recessed grooves 108 in an exterior surface. A first piston 110 (FIG. 15) surrounds the sleeve portion 80a of the body 80 and is secured thereto by a pair of C-clips that are received in the recessed grooves 108 on opposite sides of the first piston 110. The first piston 110 includes a pair of recessed grooves 111 in an outer surface for receiving a pair of seals that sealingly engage an inner surface of the sleeve 96. Delivery of hydraulic fluid to the chamber 84 between the first piston 110 and the second cap 98, via the first hydraulic passage 82 causes the first cap 94 to move upward to cause expansion of the collet 72. Delivery of hydraulic fluid to chamber 85 between the first piston 110 and the first cap 94, via the hydraulic passage 83 causes the first cap to move downward to allow retraction of the collet 72.

Figure 11:
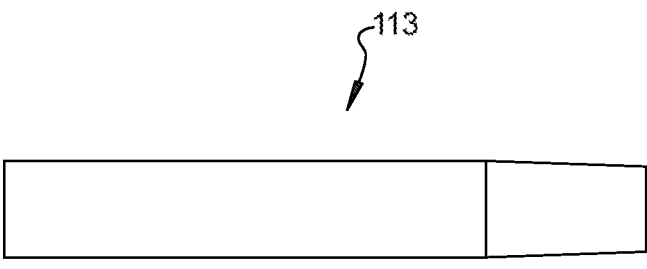
FIG. 11 is a plan view of a plug of the centering fixture.
Figure 12:
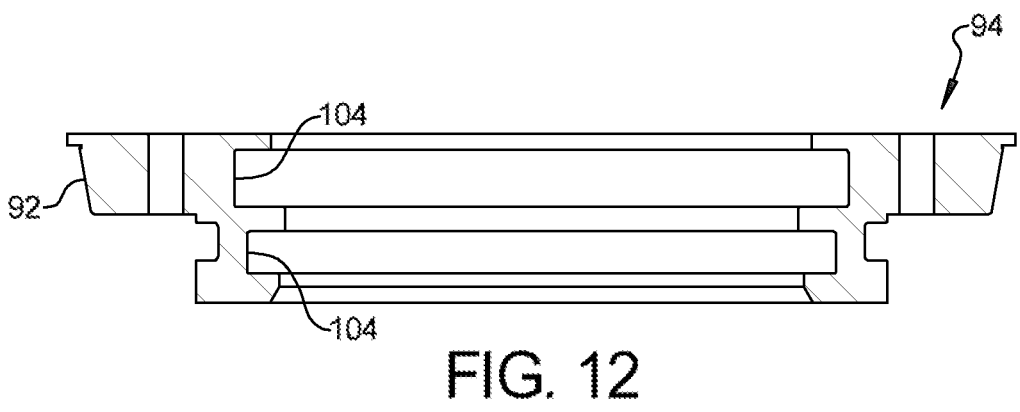
FIG. 12 is a cross-sectional view of still another cap of the centering fixture.

A rod 112 is received in the sleeve portion 80a of the body 80. As shown in FIGS. 7a-7b, the rod 112 includes a head portion 112a and a cylindrical sleeve 112a that extends below the head portion 112a and defines a cylindrical chamber 114. The head portion 112a includes three ports 116a-c that communicate with three hydraulic passages 118a-c that each communicate with three separate longitudinal zones (upper, intermediate, and lower) within the cylindrical chamber 114 of the rod 112. The head portion 112a further includes a center aperture 119 that communicates with the cylindrical chamber 114. The longitudinal hydraulic passages 118b, 118c in the rod 112 and the longitudinal hydraulic passage 82 in the body 80 can receive a plug 113 (as shown in FIG. 11) in the ends thereof in order to close off the drilled passages.

A third cap 120 (FIG. 5) is mounted to a lower end of of the cylindrical sleeve 112a of the rod 112. The third cap 120 includes a hub portion 120a with a center bore 122 extending therethrough and a radially extending flange portion 120b. A plurality of bolts 124 extend through apertures in the radial flange portion 120b. A shaft assembly 126 extends through the center bore 122. The third cap 120 includes interior grooves 128 that receive seals that engage the shaft assembly 126. An outer surface of the radially extending flange portion 120b includes a sloped surface 130. An interior sloped surface of the second collet 74 is disposed against the slope surface 130 of the third cap 120.

Figures 8, 9:
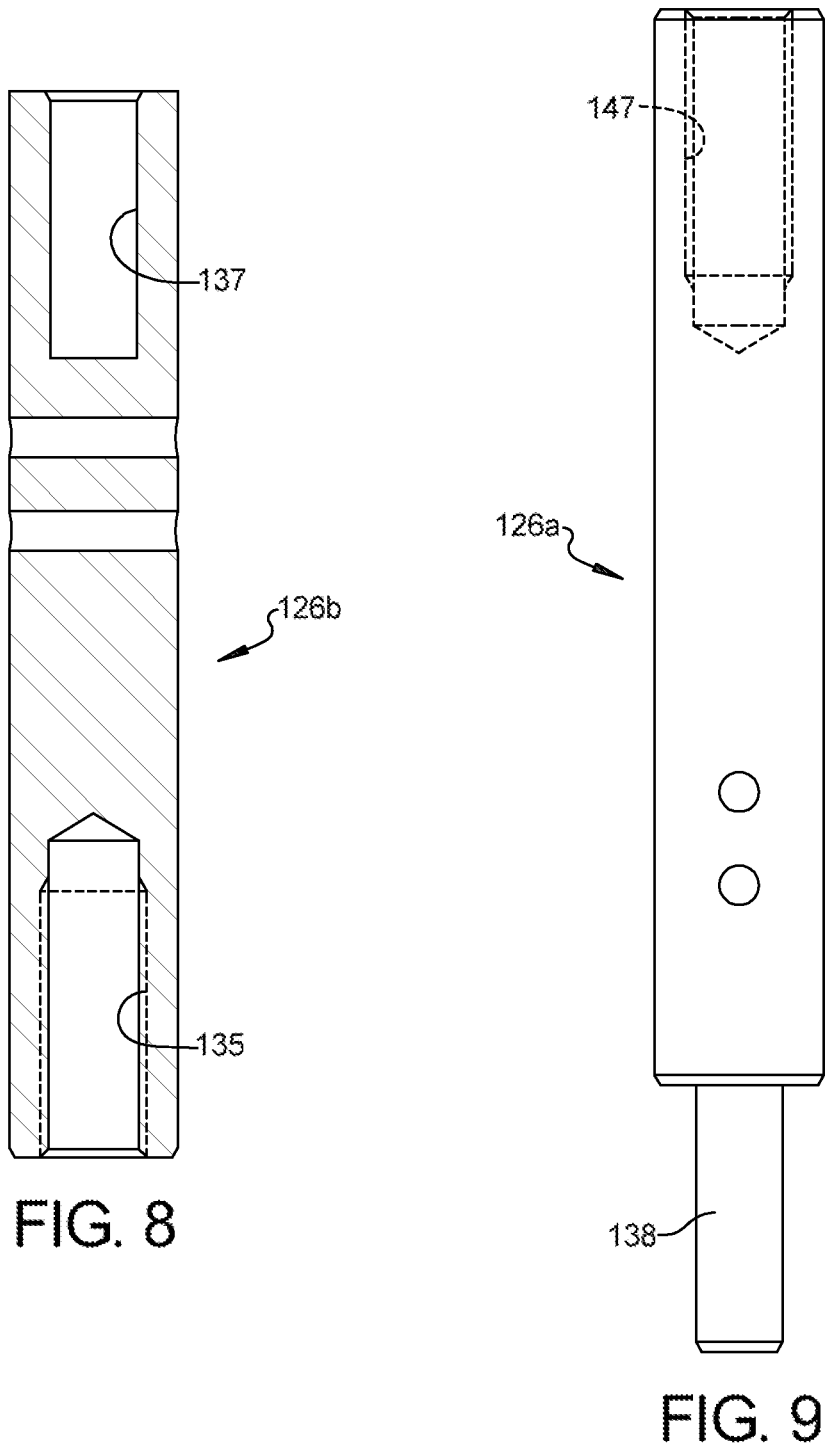
FIG. 8 is a cross-sectional view of a lower shaft of the centering fixture.
FIG. 9 is a cross-sectional view of an upper shaft of the centering fixture.
Figure 10:
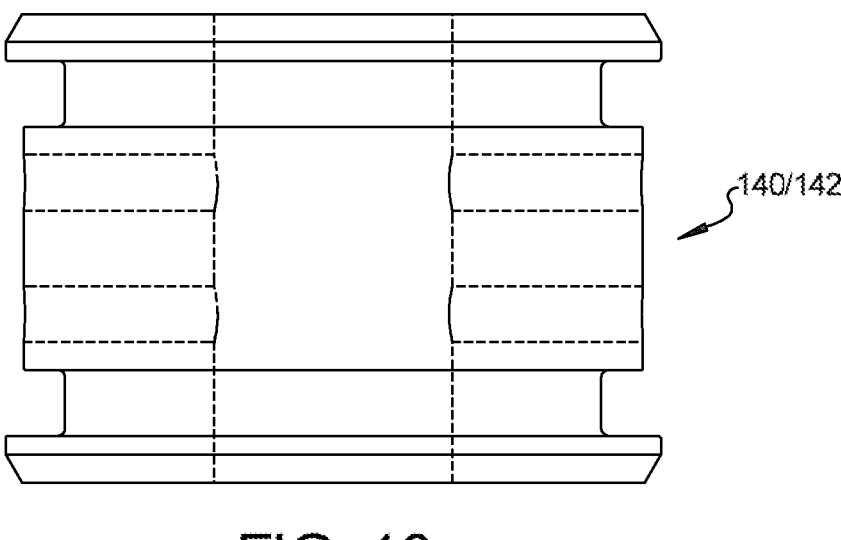
FIG. 10 is a cross sectional view of a large piston of the centering fixture.

A fourth cap 132 (FIG. 4) is mounted to a lower end of the shaft assembly 126 by a fastener 134 that extends through an aperture 133 in a hub portion 132a of the fourth cap 132 and engages a threaded aperture 135 in the end of the shaft assembly 126 (See FIG. 8). The fourth cap 132 includes a radially outwardly extending flange portion 132b that includes an outer surface with a sloped surface 136 that engages a lower interior sloped surface of the second collet 74. The second collet 74 includes a plurality of segments that are secured together by a garter spring.

The shaft assembly 126 includes an upper shaft segment 126a (FIG. 9) and a lower shaft segment 126b (FIG. 8). A lower end of the lower shaft segment 126b is connected to the fourth cap 132 by the fastener 134. An upper end of the lower shaft segment 126b includes a bore 137 that slidably receives a reduced diameter portion 138 of a lower end of the upper shaft segment 126a. A second piston 140 (FIG. 10) is secured to the lower shaft segment 126b by transverse pins and is disposed in the cylindrical chamber 114 of the rod 112. A third piston 142 (FIG. 10) is secured to the upper shaft segment 126a by transverse pins and disposed in the cylindrical chamber 114 of the rod 112. The upper shaft segment 126a has an upper end that extends through the center aperture 119 in the head portion 112a of the rod 112.

A fifth cap 144 (FIG. 4) is mounted to an upper end of the upper shaft segment 126a of the shaft assembly 126 by a fastener 146 that extends through an aperture 145 in a hub portion 144a of the fifth cap 144 and is received in a threaded aperture 147 in the upper end of the upper shaft segment 126a. The fifth cap 144 is substantially the same as the fourth cap 132 (described above with reference to FIG. 4) and includes a radially outwardly extending flange portion 144b that includes an outer surface with a sloped surface 148 that engages an upper interior sloped surface of the third collet 76. A lower interior sloped surface of the third collet 76 is disposed against a sloped exterior surface 149 at an upper end of the head portion 112a of the rod 112. The third collet 76 includes a plurality of segments that are secured together by a garter spring.

Applying a hydraulic pressure to the hydraulic chamber of the centering devices 52, 54 and 56 causes the expansion of the collets 72, 74, 76, respectively to expand radially outward in equal directions. The collets 72, 74, 76 serve to center the stator 26 at a properly centered location with respect to the output shaft bore 14 of the motor housing 10 so that the stator 26 can be precisely mounted to the motor housing 10.

In operation, applying hydraulic pressure between the second cap 98 and an upper surface of the first piston 110 via hydraulic passage 82 in the body 80, causes the second cap 98 to move upward along with the sleeve 96 and the first cap 94. As the first cap 94 moves upward toward the flange portion 80b of the body 80, the first collet 72 expands radially outward. Applying hydraulic pressure between the first cap 94 and a lower surface of the piston 110 via hydraulic passage 83 in the body 80, causes the first cap to move downward along with the sleeve 96 and the second cap 98. As the first cap 94 moves downward away from the flange portion 80b of the body 80, the first collet 72 is allowed to retract radially inward.

Applying a pressure between a lower surface of the second piston 140 and the third cap 120 via the hydraulic passage 118c in the rod 112, causes the lower shaft segment 126b to move upward along with the fourth cap 132. As the fourth cap 132 moves upward toward the third cap 120, the second collet 74 is caused to expand radially outward.

Applying a pressure between an upper surface of the third piston 142 and an upper end of the cylindrical chamber 114 via hydraulic passage 118a in the rod 112, causes the third piston 142 to move downward along with the upper shaft segment 126a and the fifth cap 144. As the fifth cap 144 moves downward toward the upper end of the head portion 112a of the rod 112, the third collet 76 is caused to expand radially outward.

Applying a pressure between a lower surface of the third piston 142 and an upper surface of the second piston 140 via the hydraulic passage 118b in the rod 112, causes the upper shaft segment 126a along with the fifth cap 144 to move upward and causes the lower shaft segment 126b along with the fourth cap 132 to move downward and allowing the second collet 74 and the third collet 76 to each retract radially inward. It should be understood that the centering fixture 50 can alternatively be operated pneumatically. Further, alternative mechanical or electro-mechanical devices and combinations or hydraulic, pneumatic, mechanical, and electro-mechanical devices can be used for operating the centering fixture 50.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of installing a stator in a motor housing, comprising:
    inserting a stator into a motor housing, the motor housing having a mounting flange, a shaft bore and a plurality of first bolt holes and the stator having a bore opening and a plurality of second bolt holes;
    loosely inserting a plurality of bolts into corresponding ones of the first bolt holes and the second bolt holes;
    inserting a centering fixture into the shaft bore of the housing and into the bore opening of the stator, the centering fixture including a first centering device received into the shaft bore and a second centering device received into the bore opening of the stator;
    securing a locating plate to the motor housing and engaged with the centering fixture;
    actuating the first centering device, for centering the centering fixture relative to the shaft bore;
    actuating the second centering device, for centering the stator relative to the shaft bore; and
    tightening the plurality of bolts to secure the stator to the motor housing.

2. The method according to claim 1, wherein the centering fixture further includes a third centering device that is received in an aperture in the locating plate.

3. The method according to claim 1, wherein the locating plate includes at least one locating dowel for engagement with a corresponding guide hole of the motor housing to properly align a bearing bore in the housing with a bearing bore in the cover plate.

4. The method according to claim 1, wherein the securing the locating plate to the motor housing includes securing the locating plate to the mounting flange of the motor housing.

5. The method according to claim 1, wherein the locating plate includes open regions that allow access to the plurality of bolts.

6. The method according to claim 1, wherein the first centering device and the second centering device of the centering fixture includes a hydraulic actuated centering device.

7. The method according to claim 1, wherein the centering fixture is fixed to the locating plate.

8. A method of installing a stator in a motor housing, comprising:
    inserting a stator into a motor housing, the motor housing having a mounting flange, a shaft bore and a plurality of first bolt holes and the stator having a bore opening and a plurality of second bolt holes;
    loosely inserting a plurality of bolts into corresponding ones of the first bolt holes and the second bolt holes;
    inserting a centering fixture into the shaft bore of the housing and into the bore opening of the stator, the centering fixture including a first centering device received into the shaft bore and a second centering device received into the bore opening of the stator;
    securing a locating plate to the motor housing and engaged with the centering fixture, the locating plate having a bore that receives a third centering device of the centering fixture;
    actuating the first centering device, for centering the centering fixture relative to the shaft bore;
    actuating the third centering device, for centering the centering fixture relative to the bore of the locating plate;
    actuating the second centering device, for centering the stator relative to the shaft bore and the bore of the locating plate; and
    tightening the plurality of bolts to secure the stator to the motor housing.

9. The method according to claim 8, wherein the locating plate includes at least one locating dowel for engagement with a corresponding guide hole of the motor housing.

10. The method according to claim 8, wherein the securing the locating plate to the motor housing includes securing the locating plate to the mounting flange of the motor housing.

11. The method according to claim 8, wherein the locating plate includes open regions that allow access to the plurality of bolts.

12. The method according to claim 8, wherein the first centering device, the second centering device and the third centering device of the centering fixture each include a hydraulic actuated centering device.

* * * * *